United States Patent [19]

Fujino et al.

[11] 3,984,437

[45] Oct. 5, 1976

[54] BASIC DYESTUFF

[75] Inventors: Sadao Fujino; Yoshio Magara, both of Kitakyushu, Japan

[73] Assignee: Mitsubishi Chemical Industries Ltd., Tokyo, Japan

[22] Filed: Apr. 2, 1975

[21] Appl. No.: 564,479

Related U.S. Application Data

[60] Continuation-in-part of Ser. No. 263,685, June 12, 1972, abandoned, which is a division of Ser. No. 67,250, Aug. 26, 1970, Pat. No. 3,741,982.

[30] Foreign Application Priority Data

Sept. 3, 1969 Japan.............................. 44-69903
Jan. 20, 1970 Japan................................ 45-5208
Feb. 6, 1970 Japan................................ 45-10468

[52] U.S. Cl............................ 260/326.15; 8/177 R; 8/178 R; 8/179; 106/176; 260/141; 260/165; 260/240 G; 260/319.1

[51] Int. Cl.²......................................... C07D 27/38

[58] Field of Search......... 260/319.1, 326.15, 240 G, 260/566 B

[56] References Cited

UNITED STATES PATENTS

| | | | |
|---|---|---|---|
| 3,331,831 | 7/1967 | Raue et al...................... | 260/240 G |
| 3,345,355 | 10/1967 | Raue.............................. | 260/240 G |
| 3,346,585 | 10/1967 | Dehnert......................... | 260/319.1 |
| 3,371,090 | 2/1968 | Johnston........................ | 260/240 G |
| 3,473,883 | 10/1969 | Mix et al........................ | 260/566 B |
| 3,527,761 | 8/1970 | Archibald et al............... | 260/319.1 |
| 3,560,490 | 2/1971 | Wyckoff........................ | 260/240 G |
| 3,790,596 | 2/1974 | Suvorov et al................. | 260/319.1 |

*Primary Examiner*—Arthur P. Demers
*Attorney, Agent, or Firm*—Oblon, Fisher, Spivak, McClelland & Maier

[57] ABSTRACT

A diazamethine cationic dyestuff is disclosed which is suitable for dyeing a synthetic fiber in yellow shade with good fastness to light and to heat.

2 Claims, No Drawings

BASIC DYESTUFF

This invention is a continuation-in-part of Ser. No. 263,685 filed on June 12, 1972, now abandoned which is a divisonal of Ser. No. 67250 filed on Aug. 26, 1970, now U.S. Pat. No. 3,741,982.

The present invention relates to a novel basic dyestuff.

The dyestuff according to the present invention is a diazamethine cationic dyestuff and it can be used to dye a synthetic fiber, especially acrylic and cellulose acetate fiber in yellow shade with good fastness, especially to light and to heat. The dyestuff is shown by following formula I

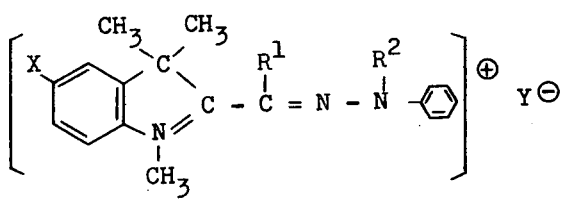

wherein $R^1$ and $R^2$ represent lower alkyl having 1 – 4 carbon atoms, respectively; X represents hydrogen, nitro, chlorine, bromine, lower alkyl having 1 – 4 carbon atoms or lower alkoxy having 1 – 2 carbon atoms and Y represents an anion.

There are various ways of preparing the novel dyestuff represented by formula I according to this invention, but it is conveniently prepared by either condensation of an oxime or a nitroso compound with phenyl hydrazine compound or a salt thereof, or alkylation of an azo compound or of a hydrazone compound.

The details of such reactions are explained hereinafter.

Condensation Process

The dyestuff represented by formula I is prepared by condensation of an oxime compound having formula II

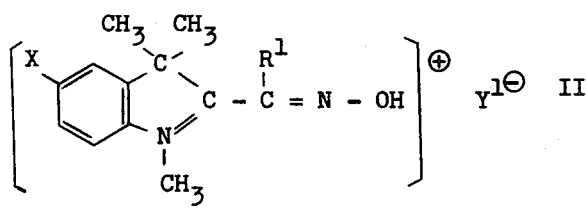

or a nitroso compound having formula III

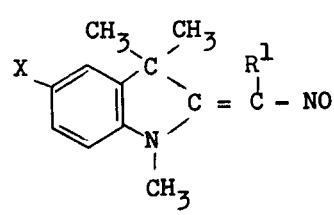

with a phenyl hydrazine compound having formula IV

or a salt of phenyl hydrazine compound having formula V

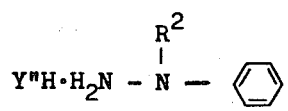

in the presence of an acid material, if necessary; in the above formulae $R^1$, $R^2$ and X have the same meanings as in the foregoing and $Y^1$ and $Y^2$ represent an anion, respectively.

The condensation reaction of an oxime or a nitroso compound with a phenyl hydrazine compound or salt thereof is conveniently carried out in the presence of at least a stoichiometric amount of the phenyl hydrazine compound or salt thereof and the temperature at which the reaction is effected generally ranges from 0° to 150°C and preferably from room temperature to 100°C.

Although the condensation reaction can be carried out in the absence of any solvent, it is preferred to effect the reaction in the presence of a solvent or a diluent for either one or both reactants. Suitable solvents include alcohols such as methanol, ethanol, butanol, isopropanol, ethylene glycol, glycerol, polyethylene glycol and thiodiethylene glycol; ethers such as ethylcellosolve, diethylene glycol butyl ether, tetrahydrofuran and dioxane; bis-oxyethyl sulfone, dimethyl sulfoxide, formamide, dimethyl formamide, diethyl formamide, tetramethylene sulfone, hexamethyl phosformamide, α- or β- alkoxy alkyl nitrile, water and mixture thereof, and such diluents include benzene, ethylacetate and tetrachloroethane.

Further, the condensation reaction can be accelerated by removing hydroxylamine formed during the reaction from the system, for example, applying vacuum conditions to the reaction mass, such as a vacuum of 70mmHg at a temperature over 60°C.

It is also preferred to add to the system either a basic substance, such as triethyl amine, pyridine and piperidine or an acid substance, such as hydrochloric, acetic and phosphoric acid in addition to such solvent or diluent, in order to effect the reaction. Especially, in the case of the condensation of a nitroso compound and a phenyl hydrazine compound, it is necessary to add such an acidic substance.

After completion of the condensation, there are various ways to recover the resulting dyestuff from the reaction system. In case the solvent is employed, (1) the solvent is distilled out to recover the dyestuff, or (2) the mixture is allowed to cool to precipitate the dyestuff. Alternatively, the reaction mixture is diluted with water and, then, (3) the dyestuff is salted out by addition of a salt, or (4) zinc chloride is added to form a water-insoluble double salt. The dyestuff or the double salt thereof separated is filtered out and, if necessary, washed with a non-polar solvent, such as benzene and toluene, to remove unreacted phenyl hydrazine compound and salts thereof.

The oxime compound employed in the condensation reaction can be prepared by treating a 2-methylene indoline compound having formula VI with nitrous acid:

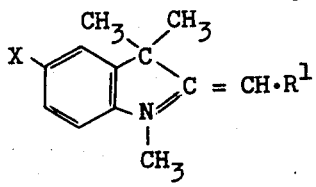

VI (wherein X and R¹ have the same meanings as in formula I), the process itself being well-known. Suitable examples of said oxime compound include 1,3,3-trimethyl-2-methyl oximinomethyl indoleninium chloride, 1,3,3-trimethyl-2-methyl oximinomethyl-5-chloro indoleninium chloride, 1,3,3-trimethyl-2-methyl oximinomethyl-5-methyl indoleninium chloride, 1,3,3-trimethyl-2-(methyl oximinomethyl)-5-methoxy indoleninium chloride, 1,3,3-trimethyl-2-(methyl oximinomethyl)-5-ethyl indoleninium chloride, 1,3,3-trimethyl-2-(methyl oximinomethyl)-5-butyl-indoleninium chloride, 1,3,3-trimethyl-2-(methyl oximinomethyl-5-chloro-indoleninium chloride and 1,3,3-trimethyl-2-methyl oximinomethyl-5-nitro indoleninium phosphate.

The nitroso compound having formula (III) is prepared by bringing an aqueous solution of the oxime compound having formula (II) into alkaline condition and separating the precipitate thus formed. Suitable examples of such nitroso compounds include 1,3,3-trimethyl-2-(methylnitrosomethylene) indoline, 1,3,3-trimethyl-2-(methylnitrosomethylene)-5-chloro indoline, 1,3,3-trimethyl-2-(methyl-nitrosomethylene)-5-methoxy indoline, 1,3,3-trimethyl-nitrosomethylene)-5-methyl indoline, 1,3,3-trimethyl-2-(methyl-nitrosoethylene)-5-ethyl indoline.

Suitable examples of the phenyl hydrazine compound having formula IV include N-phenyl-N-methyl hydrazine, N-phenyl-N-ethyl hydrazine, N-phenyl-N-propyl hydrazine and N-phenyl-N-butyl hydrazine.

Alkylation of an azo and a hydrazone compounds

Alternatively, the dyestuff having formula I according to this invention can be prepared by alkylation reaction of an azo compound having the general formula VII

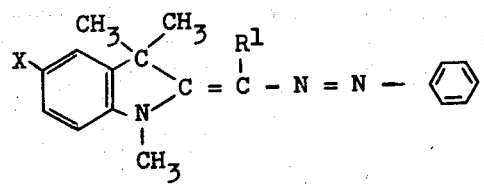

VII or a hydrazone compound having formula VIII

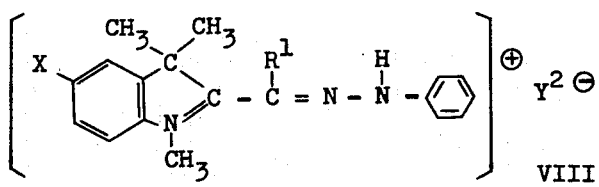

VIII (in the above formulae R¹ and X have the same meanings in formula I and Y² represents an anion).

The azo compound and hydrazone compound employed as raw materials for the production of the dyestuff according to this invention can be prepared by the coupling reaction of a 2-methylene indoline compound having the formula VI above mentioned or a compound having formula IX

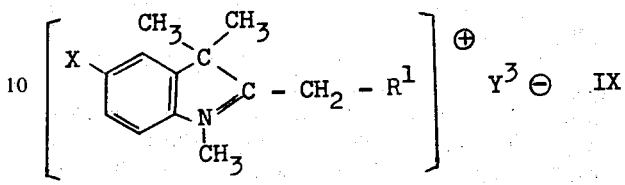

IX with a diazo compound of an aromatic amine which may contain one or more nonionic substituents (wherein R¹ and X have the same meanings in formula I and Y³ represents an anion). This coupling reaction is conveniently carried out at a temperature of from −5° to 30°C, preferably 0° to 15°C and under a pH ranging between 2 and 7, preferably 3.5 and 5. In the coupling reaction a water-soluble organic solvent, for example, an organic acid including formic acid and acetic acid, a lower aliphatic alcohol including methanol and ethanol, acetone and dimethyl formamide can be present, if desired.

The reaction product comprises mainly the hydrazone compound represented by formula VIII where the reaction medium is acidic and mainly the azo compound represented by formula VII in an alkaline reaction medium.

The dyestuff according to this invention is obtained by reacting the azo and hydrazone compounds dissolved in a solvent or diluted with a diluent with an alkylating agent at a temperature of from room temperature to 150°C. Suitable examples of said alkylating agent include dialkyl sulfates, such as dimethyl sulfate and diethyl sulfate; alkyl halides, such as methyl iodide, ethyl iodide, methyl bromide and ethyl bromide; and alkyl p-toluene sulfonates, such as methyl p-toluene sulfonate and ethyl p-toluene sulfonate. The amount of such an alkylating agent is stoichiometric or more. In the latter case, an amount in excess of the stoichiometric amount acts as a diluent.

Suitable examples of such solvents and diluents inlclude methanol, ethanol, benzene, toluene, xylene, chlorobenzene, nitrobenzene, acetone, dimethyl formamide, chloroform and carbon tetrachloride.

In the alkylation reaction, if desired, a deacidifying agent, such as magnesium oxide can be present in the system.

The anions represented by Y¹, Y² and Y³ are selected depending upon the reagents employed in the diazotization, coupling and, alkylation reactions and in the post treatment. For practical purposes they are selected from the anions mentioned above in connection with the condensation process.

The reaction mixture containing the object dyestuff is subjected to after treatment, which is a salting out or double salt forming treatment as in the case where the oxime or nitroso compound is reacted with the phenyl hydrazine compound or a salt thereof to obtain the dyestuff.

The dyestuff obtained from both processes can be purified by dissolving it in hot water, contacting the hot solution with an absorbent such as active carbon, filtering, precipitating the dyestuff and recovering the dyestuff.

The dyestuff according to this invention is a basic dyestuff and is readily soluble in warm water and an aqueous acid solution. Thus, the dyestuff can dye various synthetic fibers, especially polyacrylonitrile, polyester and cellulose acetate fibers in neutral to acid dyebaths and with printing paste. Such synthetic fibers also include blends and mixed fabrics of such synthetic fibers and other fibers as cotton, viscose rayon, wool, polyester ether and polyamide.

In dyeing, the fiber is treated in a dyebath under neutral to slightly acidic conditions containing the dyestuff according to this invention at a temperature of from room temperature to 100°C, preferably 80° to 100°C, the temperature at which the dyeing process is effected, of course, varies depending upon the sort of synthetic fiber to be dyed and the presence or absence of an assistant. Where the dyeing is carried out under pressurized conditions, a dyeing temperature over 100°C can be successfully employed. In the operation, any known dyeing assistant, such as an organic and inorganic acid, a salt thereof, a carrier, a retardant or leveling agent and an organic solvent can be used.

In printing, a printing paste is prepared from the dyestuff, a thickener, a dissolving assistant, an accelerator, a carrier, a stabilizer and an antireducing agent. The fiber is printed with such a paste and heat treated to effect the fixation of the dyestuff to the fiber.

The dyed material obtained as above is in brilliant yellow shade and possesses good fastnesses, especially to light, to heat and to potting.

Dyestuffs similar to those of this invention have been suggested. All of such known dyestuffs contain a carbon atom which is attached to the 2-position carbon in the indoline nucleus which is linked to a hydrogen atom and the nitrogen atom of the hydrazine residue, whereas in the dyestuff according to this invention the carbon atom attached to the 2-position carbon in the indoline nucleus is linked to a lower alkyl group (designated as $R_1$ in the formulae) and the nitrogen atom of the hydrazine residue. This structural difference accounts for the superior fastness of the dyestuff according to this invention to that of prior art as shown in Table 1.

As apparent from the Table, the dyestuff according to this invenion is superior to that of the prior art, in fastness to light, especially in light color.

This invention will be explained in more detail referring to the following Examples. It should be understood, however, that this invention is not restricted by the Examples. In the Examples "part" and "percentage" are expressed by weight and the absorption maximum ($\lambda$max.) is as measured in methanol solution containing 0.1% of acetic acid.

EXAMPLE 1

1,3,3-Trimethyl-2-(methyl-oximinomethyl) indoleninium chloride (2.8 parts) and N-phenyl-N-methyl hydrazine (1.5 parts) were mixed and dissolved in tetramethylene sulfone (20 parts) at 100°C and the solution was stired at that temperature for 8 hours to effect the condensation reaction. After completion of the reaction, the reaction mixture was diluted with warm water of 60°C (20 parts) and concentrated hydrochloric acid (5 parts), and, after allowing the solution to cool to 20°C, the solution was salted out by addition of sodium chloride (20 parts) and zinc chloride (5 parts) whereby yellowish orange crystals separated from solution, which were then filtered. A dyestuff having the following formula and $\lambda$max. of 433 m$\mu$ was obtained:

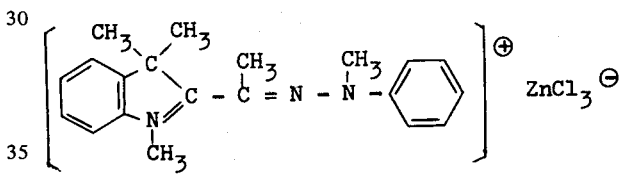

This dyestuff was admixed with a mixture of sulfamic acid (2 parts) and boric acid (70 parts) in such amounts that the resultant dyestuff composition gave a dye concentration on dyed fabric the same as that of C.I. basic yellow 11. The dyestuff composition (0.2 part) was dissolved in hot water (10 parts) and diluted with water (500 parts), then acetic acid (0.1 part), sodium acetate (0.15 parts) and a nonionic surfactant Table 1

| | Formula | Fastness to light | |
|---|---|---|---|
| | | 0.2% o.w.f. | 1% o.w.f. |
| Dyestuff of this invention | ![structure] | 4~5 | 6 |
| Prior dyestuff | ![structure] | 3~4 | 5~6 |

(0.15 parts) were added to the solution to prepare a dyebath. Polyacrylonitrile fiber (20 parts) was immersed in the bath the temperature of which was then raised to 90°C over 40 minutes and dyeing was effected at that temperature for 1 hour. The dyed fiber was washed with water, treated in a soap bath (500 parts) containing 0.5% of a detergent at 80° to 90°C for 10 minutes, washed again with water and dried. A polyacrylonitrile fiber having uniform and brilliant greenish yellow shade with excellent fastness to light was obtained.

Cellulose acetate fiber (20 parts) was dyed as in the case of polyacrylonitrile fiber to obtain dyed a fiber having uniform and brilliant greenish yellow shade.

Basacryl salt A N (available from Badische Anilin & Soda Fabrik A.G.) (0.4 parts) and Levegal PAN (available from Farbenfabriken Bayer A.G.) (1.0 part) were added to the dyebath in the same way as mentioned above and the same dyeing procedures were repeated to obtain a dyed material having uniform and brilliant greenish yellow shade.

EXAMPLE 2

A solution of aniline (0.9 parts) in a mixture of 35% hydrochloric acid (3.0 parts) and water (30 parts) was cooled and a 9.3% aqueous sodium nitrite solution (7.5 parts) was added to the solution to effect diazotization. The resulting mixture was added to a solution of 1,3,3-trimethyl-5-ethyl-2-ethylidene indoline (2.2 parts) in a mixture of 35% hydrochloric acid (1.2 parts) and water (20 parts) while cooling, and the pH value was adjusted to 3.5 – 4.0 by means of an aqueous sodium acetate solution to effect the coupling reaction. Upon completion of the coupling, the resultant solution was made alkaline by the addition of and aqueous sodium hydroxide solution and the azo compound thus precipitated was filtered.

Into a solution of the azo compound (1.5 parts) in dimethyl formamide (3 parts) was added magnesium oxide (0.5 part) and then dimethyl sulfate (4 parts) at 95° to 100°C. Methylation was carried out at that temperature for 3 hours. Then, the reaction mixture was poured into warm water (100 parts), contacted with active carbon and filtered out. The dyestuff in the filtrate was salted out by addition of sodium chloride (10 parts) and zinc chloride (1.0 part), filtered and dried at 40° – 50°C. A novel dyestuff (1 part) having the following formula (λmax. = 433 mμ)was obtained.

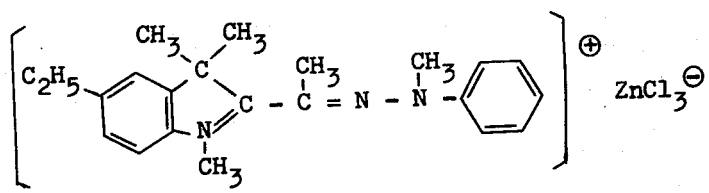

A greenish yellow shade of excellent fastness to light and to heat was obtained when the above dyestuff was applied to polyacrylonitrile fiber.

EXAMPLE 3

A solution of aniline (0.9 part) in a mixture of 35% hydrochloric acid (2.5 parts) and water (20 parts) was cooled and diazotized by addition of 9.3% aqueous sodium nitrite solution (5.7 parts). The resulting mixture was added to a solution of 1,3,3-trimethyl-2-ethylidene indoline (2.0 parts) in ethanol (15 parts) and the pH value of the system was adjusted to 3.5 – 4.0 by means and aqueous sodium acetate solution to effect the coupling reaction. After completion of the coupling, the reaction system was diluted with water (300 parts), whereby a salt of a hydrazone compound (1.2 parts) was recovered by filtration, washing the filtering material with water and drying the same at 50°C.

This salt was mixed with dimethyl sulfate (6.0 parts) and stirred at 90° – 100°C for 12 hours to effect methylation. After completion of the reaction, the resulting mixture was poured into water (300 parts), followed by stirring at 60°C for 1 hour and filtering. A crude dyestuff was separated from the filtrate by the salting out effect by addition of sodium chloride (20 parts) and filtering. The crude dyestuff was dissolved in water (300 parts) and the aqueous solution was repeatedly washed with chlorobenzene (30 parts each) to remove unreacted raw materials from the crude dyestuff. Then the dyestuff dissolved in the aqueous layer was salted out by addition of sodium chloride (10 parts) and zinc chloride (2 parts), filtered and dried.

A dyestuff of the following formula (λmax. of 433 mμ) was obtained:

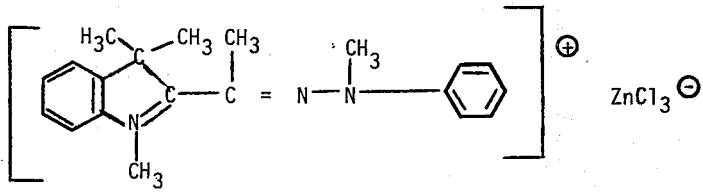

A greenish yellow shade of excellent fastness to light and to heat was obtained when the dyestuff was applied to polyacrylonitrile fiber.

Example 4

A solution of aniline (0.9 parts) in a mixture of 35% hydrochloric acid (3.0 parts) and water (30 parts) was cooled and 9.3% aqueous sodium nitrite solution (7.5 parts) was added to the solution to effect diazotization. The resulting mixture was added to a solution of 1,3,3-trimethyl-5-chloro-2-ethylidene indoline (2.3 parts) in a mixture of 35% hydrochloric acid (1.2 parts) and water (20 parts) while cooling, and the pH value was adjusted to 3.5 – 4.0 by means of an aqueous sodium acetate solution to effect the coupling reaction. Upon completion of the coupling, the resultant solution was brought to alkaline conditions by addition of and aqueous sodium hydroxide solution and the azo compound thus precipitated was filtered.

Into a solution of the azo compound (1.6 parts) in dimethyl formamide (3 parts) was added magnesium oxide (0.5 part) and then dimethyl sulfate (4 parts) at 95° to 100°C. Methylation was carried out at that temperature for 3 hours. Then, the reaction mixture was poured into warm water (100 parts), contacted with active carbon and filtered. The dyestuff in the filtrate was salted out by addition of sodium chloride (10 parts) and zinc chloride (1.0 part), filtered and dried at 40° – 50°C. A novel dyestuff (1 part) having the following formula (λmax. = 435 mμ) was obtained.

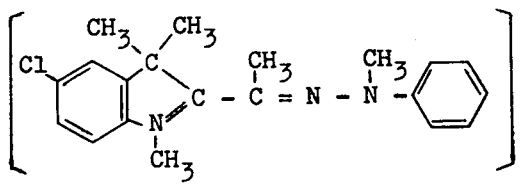

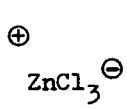

A brilliant yellow shade of excellent fastness to light and to heat was obtained when the above dyestuff was applied to polyacrylonitrile fiber.

What is claimed is:
1. A cationic dyestuff having the formula:

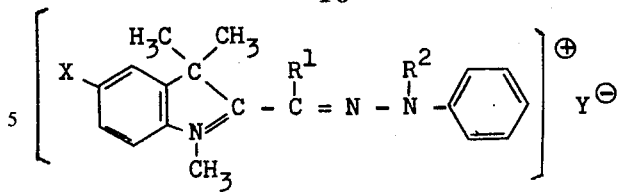

wherein $R^1$ and $R^2$ represent lower alkyl having 1 – 4 carbon atoms, X represents hydrogen, nitro, chlorine, bromine, a lower alkyl having 1 – 4 carbon atoms or a lower alkoxy having 1 –2 carbon atoms and Y represents an anion.

2. A cationic dyestuff having the formula:

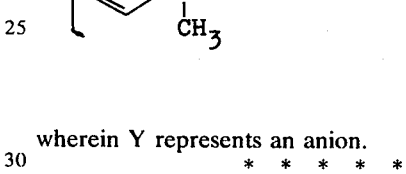

wherein Y represents an anion.

* * * * *